(12) United States Patent
Akiyama

(10) Patent No.: US 10,911,148 B2
(45) Date of Patent: Feb. 2, 2021

(54) OPTICAL TRANSMISSION APPARATUS AND OPTICAL ELEMENT

(71) Applicants: FUJITSU LIMITED, Kawasaki (JP); Photonics Electronics Technology Research Association, Tokyo (JP)

(72) Inventor: Tomoyuki Akiyama, Yokohama (JP)

(73) Assignees: FUJITSU LIMITED, Kawasaki (JP); PHOTONICS ELECTRONICS TECHNOLOGY RESEARCH ASSOCIATION, Tokyo (JP)

( * ) Notice: Subject to any disclaimer, the term of this patent is extended or adjusted under 35 U.S.C. 154(b) by 0 days.

(21) Appl. No.: 16/655,659

(22) Filed: Oct. 17, 2019

(65) Prior Publication Data
US 2020/0136729 A1 Apr. 30, 2020

(30) Foreign Application Priority Data
Oct. 30, 2018 (JP) ................................ 2018-204405

(51) Int. Cl.
*H04B 10/50* (2013.01)
*H04J 14/02* (2006.01)
(Continued)

(52) U.S. Cl.
CPC ......... *H04B 10/506* (2013.01); *H04B 10/548* (2013.01); *H04J 14/02* (2013.01); *H04J 14/06* (2013.01); *H04B 2210/003* (2013.01)

(58) Field of Classification Search
CPC ................ H04B 10/506; H04B 10/548; H04B 2210/003; H04J 14/02; H04J 14/06
See application file for complete search history.

(56) References Cited

U.S. PATENT DOCUMENTS

| 8,588,556 | B1 * | 11/2013 | Dong | ...................... G02F 1/025 |
| | | | | 385/3 |
| 2002/0044712 | A1 * | 4/2002 | Hung | ................... G02B 6/2746 |
| | | | | 385/14 |

(Continued)

FOREIGN PATENT DOCUMENTS

| JP | 2003-51809 | 2/2003 |
| JP | 2006-220862 | 8/2006 |

OTHER PUBLICATIONS

Patent Abstracts of Japan English abstract for Japanese Patent Publication No. 2003-51809, published Feb. 21, 2003.

(Continued)

*Primary Examiner* — Tanya T Motsinger
(74) *Attorney, Agent, or Firm* — Staas & Halsey LLP

(57) ABSTRACT

An optical transmission apparatus includes first and second optical waveguides to transmit light of multiple wavelengths; optical couplers on the waveguides, to couple the lights transmitted through the waveguides, so as to output the coupled light to the waveguides; phase shifters provided at preceding stages of part of the optical couplers, to change a phase shift amount of the light transmitted through the first and/or second optical waveguides, wherein the number of optical couplers in the part is greater than or equal to the number of the types of wavelengths; a monitor to monitor the intensity of the light output to the second optical waveguide via the optical coupler at the last stage; and a controller to control the phase shifters by changing the phase shift amount for each of the phase shifters in a direction in which the output of the monitor decreases.

10 Claims, 7 Drawing Sheets

(51) Int. Cl.
  *H04J 14/06* (2006.01)
  *H04B 10/548* (2013.01)

(56) References Cited

U.S. PATENT DOCUMENTS

| | | | | |
|---|---|---|---|---|
| 2002/0126291 A1* | 9/2002 | Qian | H04J 14/02 | 359/577 |
| 2003/0030865 A1 | 2/2003 | Yamada et al. | | |
| 2005/0025419 A1* | 2/2005 | Fish | G02B 6/12004 | 385/31 |
| 2005/0053320 A1* | 3/2005 | Doerr | G02B 6/12021 | 385/15 |
| 2006/0051039 A1* | 3/2006 | Wei | H04B 10/2531 | 385/123 |
| 2006/0083144 A1* | 4/2006 | Piede | G02F 1/025 | 369/100 |
| 2008/0089634 A1* | 4/2008 | Mosinskis | G02F 1/0121 | 385/3 |
| 2012/0189310 A1* | 7/2012 | Rasras | G02B 6/12007 | 398/85 |
| 2013/0044974 A1* | 2/2013 | Doerr | H04B 10/615 | 385/3 |
| 2014/0003761 A1* | 1/2014 | Dong | G02F 1/2257 | 385/3 |
| 2015/0309258 A1* | 10/2015 | Fincato | G02F 1/0115 | 398/87 |
| 2016/0103382 A1* | 4/2016 | Liboiron-Ladouceur | G02F 1/225 | 385/3 |
| 2017/0195064 A1* | 7/2017 | Chang | H04B 10/801 | |
| 2017/0293082 A1* | 10/2017 | Mower | G02B 6/29395 | |
| 2019/0293870 A1* | 9/2019 | Nebendahl | G02B 6/29338 | |
| 2020/0136729 A1* | 4/2020 | Akiyama | H04B 10/548 | |
| 2020/0145123 A1* | 5/2020 | Melikyan | H04B 10/572 | |

OTHER PUBLICATIONS

Patent Abstracts of Japan English abstract for Japanese Patent Publication No. 2006-220862, published Aug. 24, 2006.

* cited by examiner

OPTICAL TRANSMISSION APPARATUS AND OPTICAL ELEMENT

CROSS-REFERENCE TO RELATED APPLICATIONS

This application is based upon and claims the benefit of priority of the prior Japanese Priority Application No. 2018-204405 filed on Oct. 30, 2018, the entire contents of which are hereby incorporated by reference.

FIELD

The present disclosure relates to an optical transmission apparatus and an optical element.

BACKGROUND

Wavelength-Division-Multiplexing (WDM) optical communication is being practiced. In WDM optical communication, a demultiplexer is included in an optical receiver circuit, to demultiplex a WDM signal into signals having respective wavelengths. In general, when a demultiplexer is implemented as a photonic integrated circuit (PIC), the demultiplexer has high polarization dependence, which functions only for waves polarized in a particular direction.

Meanwhile, the polarization direction of WDM signals reaching an optical receiver circuit through an optical fiber is not fixed and varies over time. Therefore, in an optical receiver circuit using a demultiplexer having high polarization dependence, WDM signals cannot be received stably.

Such instability of reception caused by polarization dependence may be controlled by configuring an optical receiver circuit such that a WDM signal is split into two orthogonal polarized waves, and then, each polarized wave is input into separate demultiplexers. However, in the case of using two demultiplexers, unless the transmission spectrum is highly precisely matched between the two demultiplexers, optical signals cannot be received properly.

Related-Art Document

Patent Document 1: Japanese Laid-Open Patent Application No. 2003-51809
Patent Document 2: Japanese Laid-Open Patent Application No. 2006-220862

SUMMARY

According to one aspect of the present disclosure, an optical transmission apparatus includes a first optical waveguide and a second optical waveguide configured to transmit light having a plurality of types of wavelengths; a plurality of optical couplers provided on the first optical waveguide and the second optical waveguide, and configured to couple the light transmitted through the first optical waveguide with the light transmitted through the second optical waveguide, so as to output the coupled light to the first optical waveguide and the second optical waveguide; a plurality of phase shifters provided at preceding stages of part of the plurality of optical couplers, and configured to change a phase shift amount of the light transmitted through the first optical waveguide, transmitted through the second optical waveguide, or transmitted through both the first optical waveguide and the second optical waveguide, wherein a number of optical couplers in the part is greater than or equal to a number of the plurality of types of wavelengths; a monitor configured to monitor an intensity of the light output to the second optical waveguide via one of the plurality of optical couplers at a last stage; and a controller configured to control the plurality of phase shifters. The controller increases or decreases the phase shift amount for each of the phase shifters to determine a direction of change to decrease an output of the monitor for each of the phase shifters, and changes the phase shift amount in the direction in each of the phase shifters.

The object and advantages in the embodiment will be realized and attained by means of the elements and combinations particularly pointed out in the claims. It is to be understood that both the foregoing general description and the following detailed description are exemplary and explanatory and are not restrictive of the invention as claimed.

DESCRIPTION OF EMBODIMENTS

In the following, embodiments of the present disclosure will be described specifically with reference to the accompanying drawings. Note that in the present specification and the drawings, components having substantially the same functional configuration are given the same reference codes, and duplicate description may be omitted.

According to the present disclosure, it is possible to perform demultiplexing by using a single wavelength demultiplexing element.

First Embodiment

Figure 1:
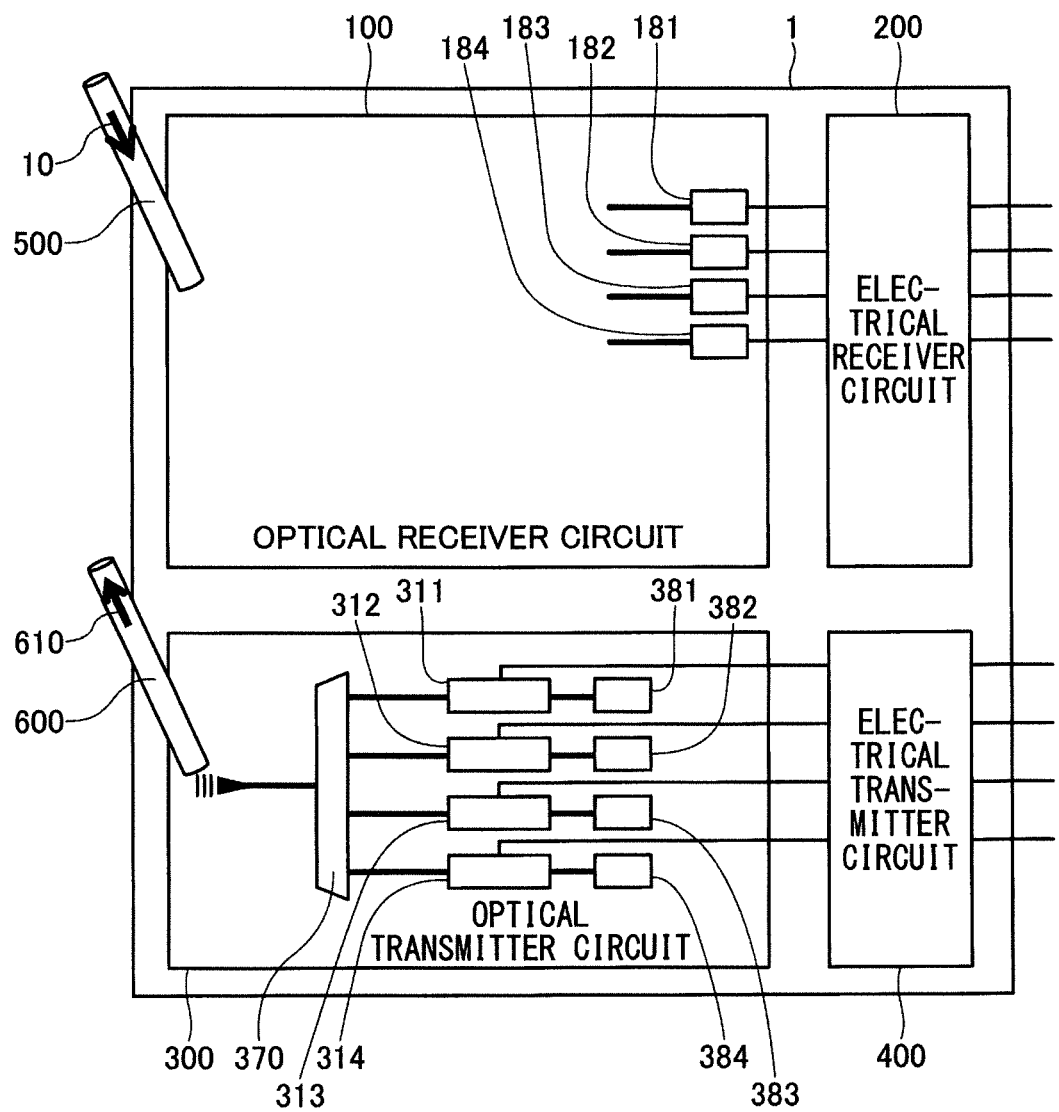
FIG. 1 is a diagram illustrating a configuration of an optical transmission apparatus according to a first embodiment.

A first embodiment will be described. FIG. 1 is a diagram illustrating a configuration of an optical transmission apparatus 1 according to the first embodiment.

As illustrated in FIG. 1, the optical transmission apparatus 1 according to the first embodiment includes an optical receiver circuit 100, an electrical receiver circuit 200, an optical transmitter circuit 300, and an electrical transmitter circuit 400. The optical receiver circuit 100 is connected to an optical fiber 500, receives as input an optical signal from the optical fiber 500, and outputs electrical signals. The electrical receiver circuit 200 receives electrical signals output by the optical receiver circuit 100, applies signal processing to the electrical signals, and outputs electrical signals after the signal processing to the outside of the optical transmission apparatus 1. The electrical transmitter circuit 400 receives electrical signals from the outside, applies signal processing to the electrical signals, and outputs electrical signals after the signal processing. The optical transmitter circuit 300 receives electrical signals output by the electrical transmitter circuit 400 and outputs an optical signal to an optical fiber 600. In the present embodiment, an optical signal 10 transmitted through the optical fiber 500 is a Wavelength-Division-Multiplexing (WDM) optical signal, which includes, for example, four types of signals having different wavelengths (four channels of signals). Here, the wavelengths of the respective signals are denoted as $\lambda_1$, $\lambda_2$, $\lambda_3$, and $\lambda_4$.

Figure 2:
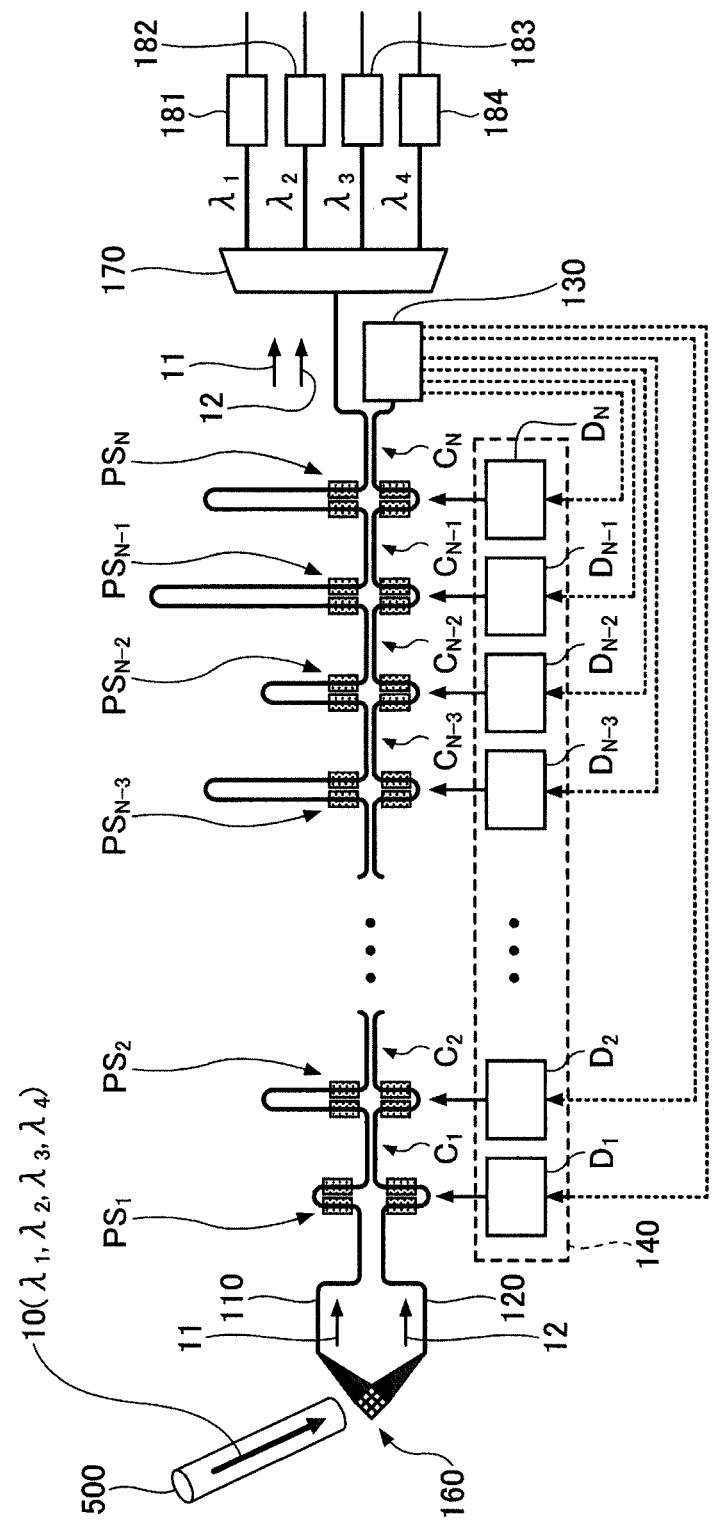
FIG. 2 illustrates a configuration of an optical receiver circuit in the first embodiment.

Next, a configuration of the optical receiver circuit 100 will be described. FIG. 2 is a diagram illustrating a configuration of the optical receiver circuit 100 in the first embodiment.

As illustrated in FIG. 2, the optical receiver circuit 100 includes a two-dimensional grating coupler 160, a first optical waveguide 110, and a second optical waveguide 120. The two-dimensional grating coupler 160 splits the optical signal 10 into two orthogonal polarized waves, to cause one of the two polarized waves (polarized wave 11) to propagate through the first optical waveguide 110 and the other (polarized wave 12) to propagate through the second optical waveguide 120. Also, the two-dimensional grating couplers 160 transforms the polarization directions (polarization states) into the same direction between the polarized waves 11 and 12.

The first optical waveguide 110 and the second optical waveguide 120 are provided with N instances of two-input, two output optical couplers $C_1$, $C_2$, ..., $C_{N-1}$, and $C_N$, where N represents an integer greater than or equal to the number of types of wavelengths (the number of channels), which is here an integer greater than or equal to 4. Two adjacent optical couplers $C_{a-1}$ and $C_a$ (where a is an integer greater than or equal to 2 and less than or equal to N) are connected in cascade via a waveguide pair of the first optical waveguide 110 and the second optical waveguide 120, and a phase shifter $PS_a$ is provided with each waveguide pair at the preceding stage of the optical coupler $C_a$. For example, a phase shifter $PS_2$ is provided in a waveguide pair between the optical couplers $C_1$ and $C_2$, and a phase shifter $PS_N$ is provided in a waveguide pair between the optical couplers $C_{N-1}$ and $C_N$. On the input side of the optical coupler $C_1$, a waveguide pair including a phase shifter $PS_1$ is provided.

On the output side of the optical coupler $C_N$, a demultiplexer 170 is connected to the first optical waveguide 110, and light-receiving elements 181, 182, 183, and 184, such as photodiodes, are connected to the outputs of the demultiplexer 170. The demultiplexer 170 demultiplexes an input optical signal into signals having the respective wavelengths, outputs an optical signal having the wavelength $\lambda_1$ to the light-receiving element 181, outputs an optical signal having the wavelength $\lambda_2$ to the light-receiving element 182, outputs an optical signal having the wavelength $\lambda_3$ to the light-receiving element 183, and outputs an optical signal having the wavelength $\lambda_4$ to the light-receiving element 184. The light-receiving elements 181 to 184 output electrical signals corresponding to the intensity of the received light, respectively.

The optical receiver circuit 100 includes a control circuit 140. The control circuit 140 includes N instances of phase-shift controllers $D_1$, $D_2$, ..., $D_{N-1}$, and $D_N$. Also, on the output side of the optical coupler $C_N$, a monitor 130 is connected to the second optical waveguide 120. The monitor 130 monitors the intensity of light propagating through the second optical waveguide 120, and outputs signals in accordance with the intensity to the phase-shift controllers $D_1$ to $D_N$, respectively. The phase-shift controllers $D_1$ to $D_N$ control the phase shifters $PS_1$ to $PS_N$ in accordance with the outputs of the monitor 130, respectively.

Next, operations of the optical receiver circuit 100 will be described.

An optical signal 10 that has propagated through the optical fiber 500 is split into two orthogonal polarized waves 11 and 12 by the two-dimensional grating coupler 160 and is transformed to have the same polarization direction. For example, an optical signal 10 including a polarized wave in a TM (Transverse Magnetic) mode and a polarized wave in a TE (Transverse Electric) mode is split into a TM-mode polarized wave 11 and a TE-mode polarized wave 12, and the polarization state of the polarized wave 11 is transformed from the TM mode to the TE mode. Therefore, the TE-mode polarized wave 11 transformed from the TM mode propagates through the first optical waveguide 110 and the TE-mode polarized wave 12 propagates through the second optical waveguide 120. For this reason, the polarization states of polarized waves 11 and 12 output from the optical coupler $C_N$ at the final stage are also in the TE mode.

The control circuit 140 controls the phase shifters $PS_1$ to $PS_N$ so as to reduce the intensity of light output from the optical coupler $C_N$ to the second optical waveguide 120. Specifically, the control circuit 140 causes one of the phase-shift controllers $D_1$ to $D_N$ to increase or decrease the phase shift amount of a phase shifter corresponding to the phase-shift controller, to determine at the moment which operation of increase or decrease of the phase shift amount by the phase-shift controller decreases the output of the monitor 130. Then, the phase-shift controller causes the phase shifter to change the phase shift amount as determined, so as to decrease the output of the monitor 130. This operation is performed for the phase-shift controllers $D_1$ to $D_N$ at respective timings different from each other. As a result, the intensity of the light output from the optical coupler $C_N$ to the second optical waveguide 120 gradually decreases. Further, by repeating this control by the phase-shift controllers $D_1$ to $D_N$, the intensity of the light input into the monitor 130 approaches zero. This means that the output destinations of both the polarized waves 11 and 12 are converged into the first optical waveguide 110. In other words, without depending on the polarization direction of an optical signal 10, optical signals having a single polarization direction are converged into the first optical waveguide 110.

The demultiplexer 170 demultiplexes an input single-mode optical signal into signals having the respective wavelengths, outputs an optical signal having the wavelength $\lambda_1$ to the light-receiving element 181, outputs an optical signal having the wavelength $\lambda_2$ to the light-receiving element 182, outputs an optical signal having the wavelength $\lambda_3$ to the light-receiving element 183, and outputs an optical signal having the wavelength $\lambda_4$ to the light-receiving element 184. Then, the light-receiving elements 181 to 184 output electrical signals corresponding to the intensity of the received light, respectively.

The electrical receiver circuit 200 applies signal processing to electrical signals output by the light-receiving elements 181 to 184, and outputs the electrical signals after the signal processing to the outside of the optical transmission apparatus 1.

Next, the optical transmitter circuit 300 will be described. As illustrated in FIG. 1, the optical transmitter circuit 300 includes light-emitting elements 381, 382, 383 and 384, such as laser diodes, modulators 311, 312, 313 and 314, and a multiplexer 370. The modulators 311 to 314 are controlled by control signals from the electrical transmitter circuit 400.

The modulators 311 to 314 modulate optical signals output by the light-emitting elements 381-384 to output signals to the multiplexer 370, respectively. The multiplexer 370 multiplexes optical signals output by the modulators 311 to 314, to output a multiplexed signal 610 to the optical fiber 600.

In the optical transmission apparatus 1 configured as such, regardless of the polarization direction of an optical signal 10, optical signals having a single polarization direction are converged into the first optical waveguide 110 to be input into the single demultiplexer 170. Thus, by using the single demultiplexer 170, demultiplexing can be suitably performed to stably receive WDM signals.

Note that the amount of increase or decrease of the phase shift amount by each of the phase-shift controllers $D_1$ to $D_N$ is not limited in particular. However, a greater amount of increase or decrease causes the output of the monitor 130 to change considerably, and the output may be adjusted coarser. On the other hand, a smaller amount of increase or decrease enables fine adjustment, although a greater number of adjustments of the phase shift amount may be required. Accordingly, it is favorable to set the amount of increase or decrease in consideration of these factors.

Second Embodiment

Figure 3:
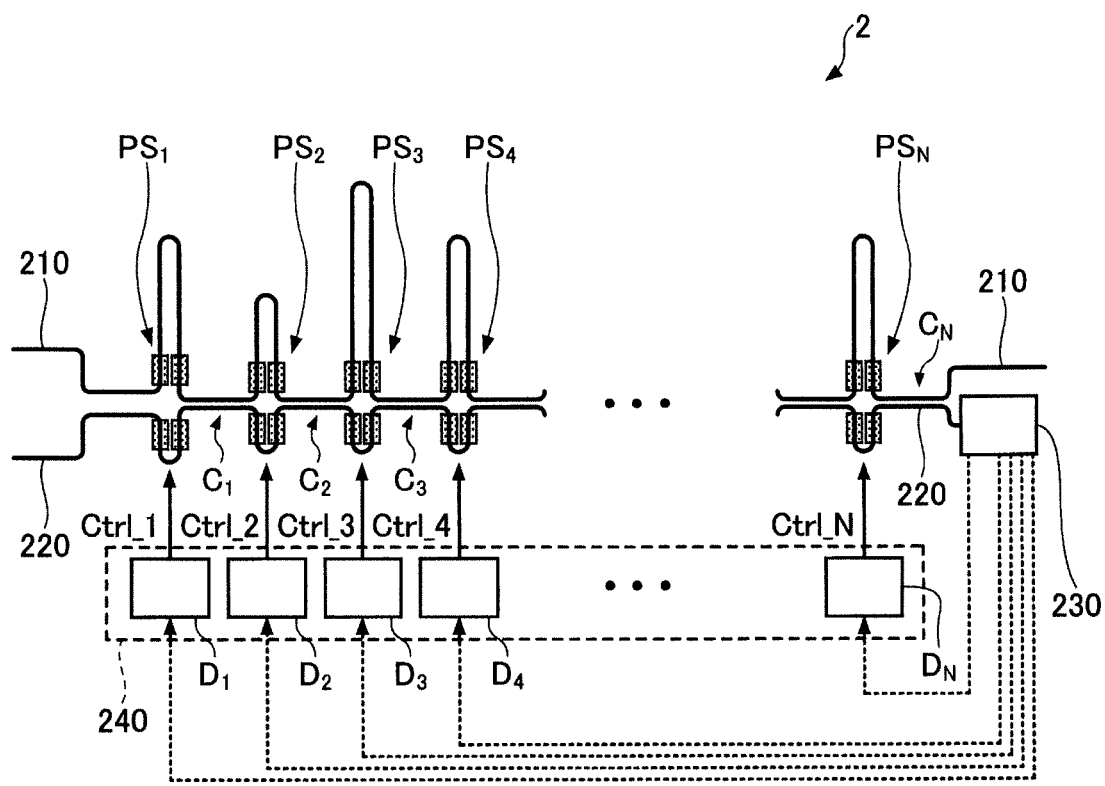
FIG. 3 is a diagram illustrating a configuration of an optical element according to a second embodiment.

Next, a second embodiment will be described. The second embodiment relates to an optical element suitable for the optical receiver circuit 100. FIG. 3 is a diagram illustrating a configuration of an optical element 2 according to the second embodiment.

The optical element 2 according to the second embodiment includes a first optical waveguide 210 and a second optical waveguide 220 as illustrated in FIG. 3. As the first optical waveguide 210 and the second optical waveguide 220, for example, Si optical waveguides may be used that are provided with a core of Si and a cladding of $SiO_2$. The first optical waveguide 210 and the second optical waveguide 220 receive, as input, optical signals having the same polarization direction.

The first optical waveguide 210 and the second optical waveguide 220 are provided with N instances of two-input, two-output, 3dB couplers $C_1, C_2, \ldots, C_{N-1}$, and $C_N$, where N is an integer greater than or equal to the number of types of wavelengths. Two adjacent 3dB couplers $C_{a-1}$ and $C_a$ (where a is an integer greater than or equal to 2 and less than or equal to N) are connected in cascade with each other via a waveguide pair of the first optical waveguide 210 and the second optical waveguide 220, and a phase shifter $PS_a$ is provided with each waveguide pair at the preceding stage of the 3dB coupler $C_a$. For example, a phase shifter $PS_2$ is provided in a waveguide pair between the 3dB couplers $C_1$ and $C_2$, and a phase shifter $PS_N$ is provided in a waveguide pair between the 3dB couplers $C_{N-1}$ and $C_N$. Also, on the input side of the 3dB coupler $C_1$, a waveguide pair including a phase shifter $PS_1$ is provided. In the 3dB couplers $C_1$ to $C_N$, optical coupling can be used, which is caused by, for example, arranging the first optical waveguide 210 and the second optical waveguide 220 close to each other. As the phase shifters $PS_1$, to $PS_N$, for example, heaters containing a high-resistance metal may be used. The temperature of the first optical waveguide 210 and the second optical waveguide 220 varies depending on a voltage applied to the high-resistance metal, which enables to adjust the phase shift amount.

The optical element 2 includes a control circuit 240. The control circuit 240 includes N instances of phase-shift controllers $D_1, D_2, \ldots, D_{N-1}$, and $D_N$. The phase-shift controllers $D_1, D_2, \ldots, D_{N-1}$, and $D_N$ output control signals Ctrl_1, Ctrl_2 . . . , Ctrl_N-1, and Ctrl_N, respectively. On the output side of 3dB coupler $C_N$ at the final stage, a monitor 230 for detecting the intensity of light is connected to the second optical waveguide 220. As the monitor 230, for example, a photodiode may be used. The monitor 230 monitors the intensity of light propagating through the second optical waveguide 220 and outputs signals in accordance with the intensity to the phase-shift controllers $D_1$ to $D_N$, respectively. The phase-shift controllers $D_1$ to $D_N$ control the phase shifters $PS_1$ to $PS_N$ by the control signals Ctrl_1 to Ctrl_N in accordance with the outputs of the monitor 230, respectively.

Figure 4:
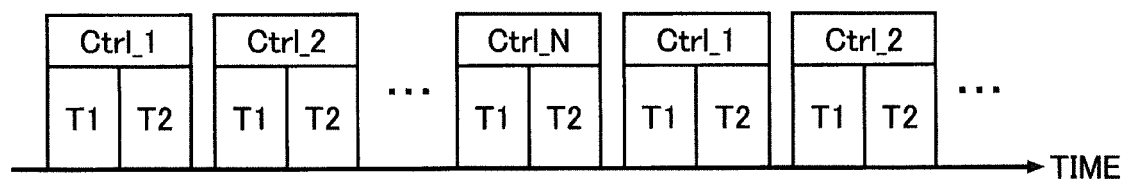
FIG. 4 is a diagram illustrating control signals.
Figure 5:
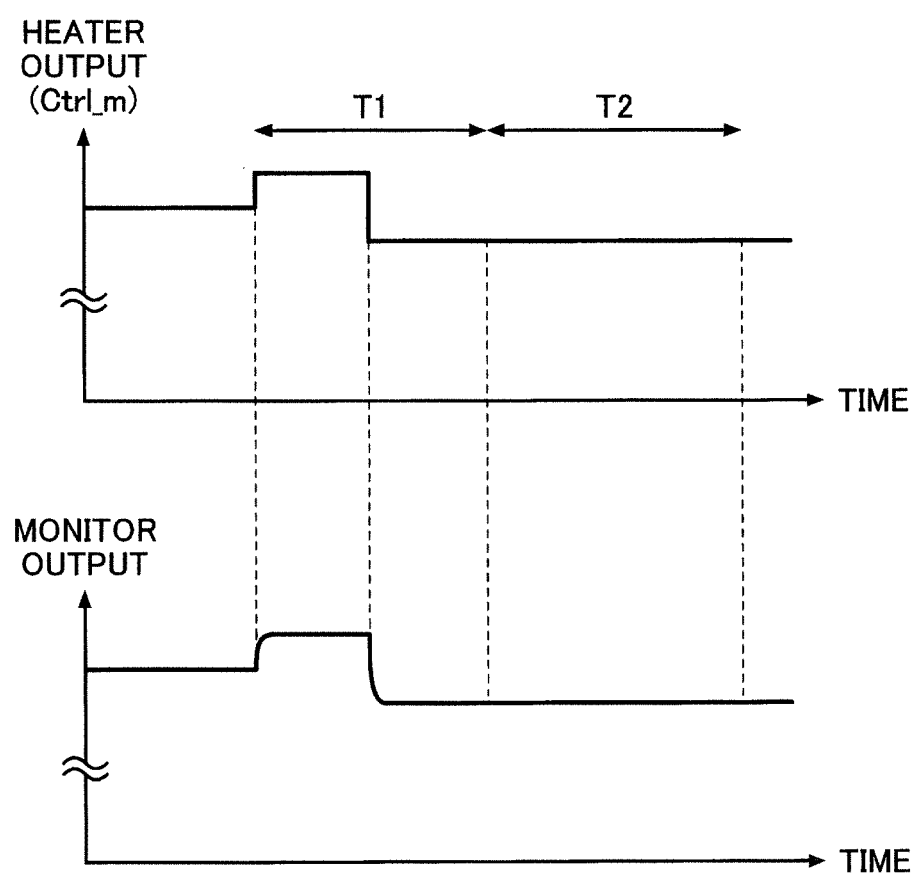
FIG. 5 is a first diagram illustrating a relationship between change in the output of a heater and change in the output of a light intensity detector.
Figure 6:
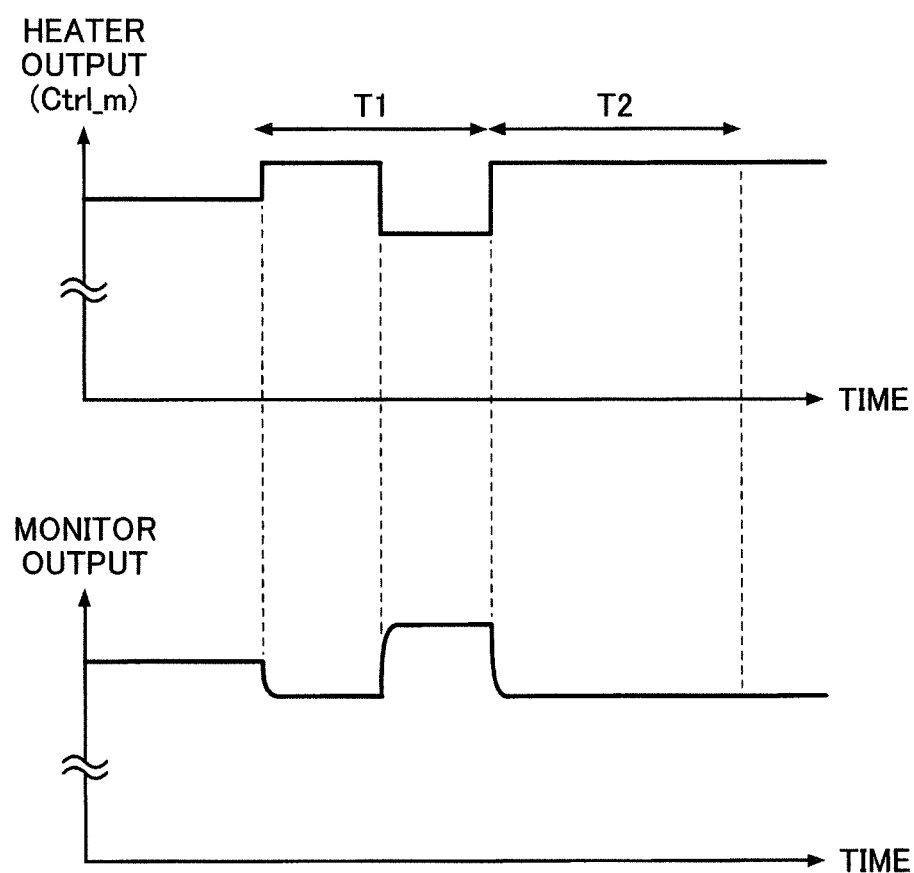
FIG. 6 is a second diagram illustrating a relationship between change in the output of a heater and change in the output of a light intensity detector.

Next, operations of the optical element 2 will be described. FIG. 4 is a diagram illustrating control signals; and FIGS. 5 and 6 are diagrams illustrating a relationship between a change in the output of a heater and a change in the output of a light intensity detector.

As illustrated in FIG. 4, the control circuit 240 sequentially outputs the control signals Ctrl_1 to Ctrl_N from the respective phase-shift controllers $D_1$ to $D_N$. Each of the control signals Ctrl_1 to Ctrl_N includes a period T1 and a period T2. As illustrated in FIGS. 5 and 6, in the period T1, the output of the heater of a phase shifter $PS_m$ (where m is an integer greater than or equal to 1 and less than or equal to N) is increased and then decreased. FIG. 5 illustrates an example in which the output of the monitor 230 increases in a period during which the heater output is increased and the output of the monitor 230 decreases in a period during which the heater output is decreased. FIG. 6 illustrates an example in which the output of the monitor 230 decreases in a period during which the heater output is increased and the output of the monitor 230 increases in a period during which the heater output is decreased. If the output of the monitor 230 changes in the period T1 as illustrated in the example illustrated in FIG. 5, the phase-shift controller $D_m$ maintains the decreased output of the heater of the phase shifter $PS_m$ in the period T2 by using the control signal Ctrl_m. In contrast, if the output of the monitor 230 changes in the period T2 as illustrated in the example illustrated in FIG. 6, the phase-shift controller $D_m$ increases the output of the heater of the phase shifter $PS_m$ in the period T2 by using the control signal Ctrl_m and maintains the increased state. Therefore, the output of the monitor 230 decreases every time one of the control signals Ctrl_1 to Ctrl_N is output. Further, repetition of such operations by the control circuit 240 as illustrated in FIG. 4 sequentially outputs the control signals Ctrl_1 to Ctrl_N from the phase-shift controllers $D_1$ to $D_N$, and the output of the monitor 230 approaches zero. In other words, an optical signal input into the first optical waveguide 210 and an optical signal input into the second optical waveguide 220 are converged into the first optical waveguide 210 to be output.

According to the optical element 2 as such, it is possible to stably output an optical signal having a single polarization direction from the first optical waveguide 210. Therefore, by connecting the demultiplexer to the first optical waveguide 210, demultiplexing can be suitably performed.

Note that in the period T1, the number of times to increase or decrease the heater output is not limited to one, but may be two or more. Also, the output order of the control signals Ctrl_1 to Ctrl_N does not need to be arranged in accordance with the propagation direction of the optical signal; for example, the even-numbered control signals may be output sequentially after the odd-numbered control signals are output sequentially. Also, the control frequency is not limited in particular. For example, the control frequency may be adjusted depending on the environment in which the optical element 2 is used.

Note that in the present disclosure, the material of an optical waveguide is not limited in particular. For example, an optical waveguide of a compound semiconductor with a core of InGaAs and a cladding of InP may be used. Other types of compound semiconductors may be used. A dielectric may be used for both the core and the cladding.

Also, the phase shifter is not limited to the one that uses a heater. For example, an electro-optic phase shifter having a PN junction formed in an Si optical waveguide may be used. A device having another electro-optic material provided in an optical waveguide may be used. The configuration of a heater is not limited to a configuration that includes a high-resistance metal.

So long as the number of phase shifters is greater than or equal to the number of channels, part of multiple waveguide pairs may not be provided with phase shifters. In other words, the number of phase shifters may be less than the number of optical couplers. Also, it is not necessary to provide phase shifters for both of the two optical waveguides forming the waveguide pairs; only one of them may be provided with phase shifters. Also, the lengths and differences in the lengths of the waveguide pairs can be set discretionarily, which may be different or the same among the multiple waveguide pairs.

The optical element 2 according to the second embodiment can be used in the optical receiver circuit 100, to constitute an optical transmission apparatus including the optical element 2.

Third Embodiment

Figure 7:
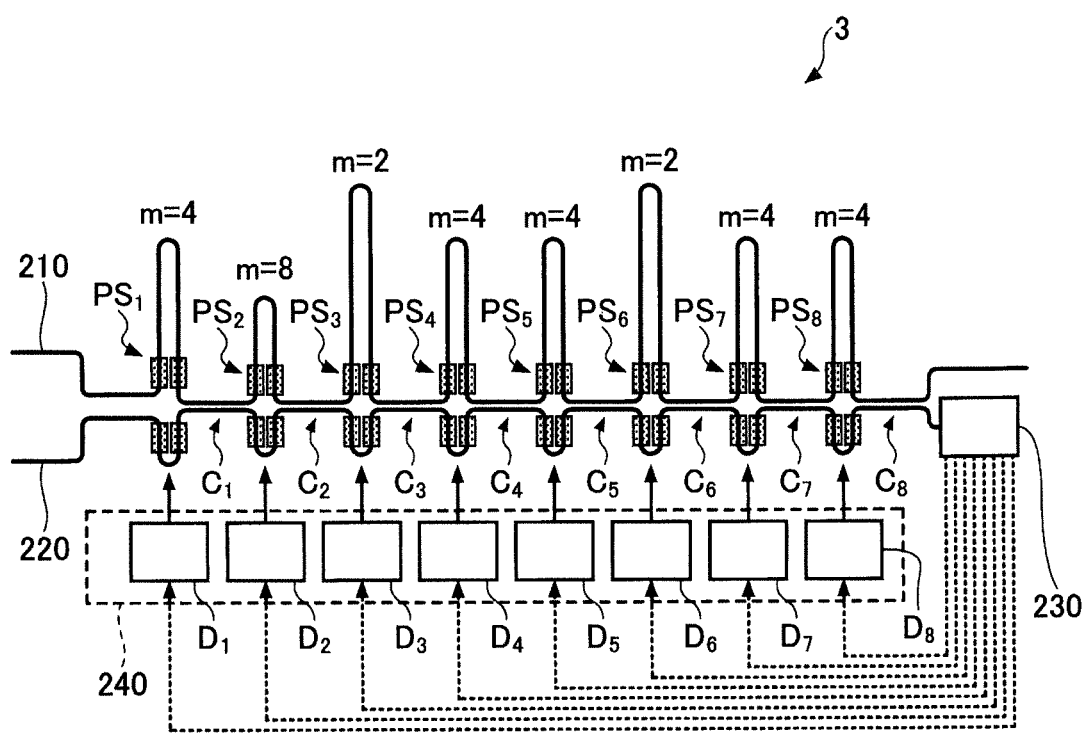
FIG. 7 is a diagram illustrating a configuration of an optical element according to a third embodiment.

Next, a third embodiment will be described. The third embodiment relates to an optical element suitable for the optical receiver circuit 100. FIG. 7 is a diagram illustrating a configuration of an optical element 3 according to the third embodiment.

As illustrated in FIG. 7, the optical element 3 according to the third embodiment includes eight instances of optical couplers $C_1$ to $C_8$, eight instances of phase shifters $PS_1$ to $PS_8$, and eight instances of phase-shift controllers $D_1$ to $D_8$. The waveguide length difference between a first optical waveguide 210 and a second optical waveguide 220 at each waveguide part is set to $c/(m \cdot n_G \cdot \Delta f)$ where c represents the speed of light, m represents an integer, $n_G$ represents the group refractive index, and $\Delta f$ represents the channel frequency spacing. Specifically, in the first, fourth, fifth, seventh, and eighth waveguide pairs from the input side, the waveguide length difference is set to $c/(4n_G \cdot \Delta f)$. In the second waveguide pair, the waveguide length difference is set to $c/(8n_G \cdot \Delta f)$, and in the third and sixth waveguide pairs, the waveguide length difference is set to $c/(2n_G \cdot \Delta f)$.

The other components are substantially the same as in the second embodiment.

In the optical element 3 configured as such, the waveguide length difference is set as appropriate in each waveguide pair; therefore, it is possible to more efficiently converge optical signals into the first optical waveguide 210 with a smaller number of phase shifters. Therefore, it is suitable for downsizing.

Note that the arrangement of values of m is not limited in particular. Even if values of m are arranged differently, optical signals can be efficiently converged into the first optical waveguide 210 with a small number of phase shifters. Also, although the values of m are favorably integers, the values may be slightly different from integers.

The optical element 3 according to the third embodiment can be used in the optical receiver circuit 100, to constitute an optical transmission apparatus including the optical element 3.

Next, a simulation related to the third embodiment will be described. In this simulation, the number of optical couplers, phase shifters, and phase-shift controllers was 9. Also, the waveguide length difference for each waveguide pair was set to $c/(4n_G \cdot \Delta f)$. Then, a simulation model was controlled as illustrated in FIGS. 4 to 6. In other words, for each control signal, the output of the heater was increased or decreased slightly to determine a decreasing direction of the output of the monitor, to change the output of the heater in that direction. Results of this simulation are illustrated in FIG. 8.

Figure 8:
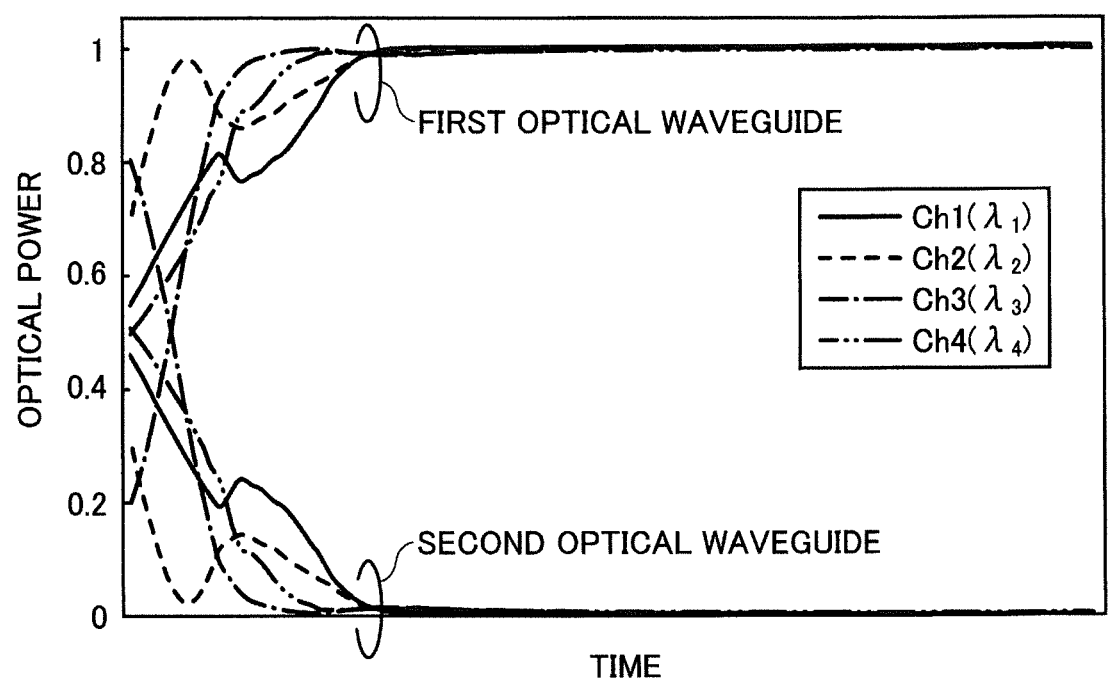
FIG. 8 is a diagram illustrating results of a simulation.

As illustrated in FIG. 8, as time elapsed, the optical power in the second optical waveguide approached zero, whereas the optical power in the first optical waveguide approached 1. In other words, the optical signals were converged into the output port of the first optical waveguide.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission apparatus, comprising:
   a first optical waveguide and a second optical waveguide configured to transmit light having a plurality of types of wavelengths;
   a plurality of optical couplers provided on the first optical waveguide and the second optical waveguide, and configured to couple the light transmitted through the first optical waveguide with the light transmitted through the second optical waveguide, so as to output the coupled light to the first optical waveguide and the second optical waveguide;
   a plurality of phase shifters provided at preceding stages of part of the plurality of optical couplers, and configured to change a phase shift amount of the light transmitted through the first optical waveguide, transmitted through the second optical waveguide, or transmitted through both the first optical waveguide and the second optical waveguide, wherein a number of optical couplers in the part is greater than or equal to a number of the plurality of types of wavelengths;
   a monitor configured to monitor an intensity of the light output to the second optical waveguide via one of the plurality of optical couplers at a last stage; and
   a controller configured to control the plurality of phase shifters,
   wherein the controller increases or decreases the phase shift amount for each of the plurality of phase shifters to determine a direction of change to decrease an output of the monitor for said each of the plurality of phase shifters, and changes the phase shift amount in the direction in said each of the plurality of phase shifters.

2. The optical transmission apparatus as claimed in claim 1, wherein a polarization direction of the light transmitted through the first optical waveguide matches a polarization direction of the light transmitted through the second optical waveguide.

3. The optical transmission apparatus as claimed in claim 1, wherein the controller repeatedly executes a process of changing the phase shift amount in the direction in said each of the plurality of phase shifters, among the plurality of phase shifters.

4. The optical transmission apparatus as claimed in claim 1, wherein at each portion where said each of the plurality of phase shifter is provided, a waveguide length difference between the first optical waveguide and the second optical waveguide is a fraction of $c/(n_G \cdot \Delta f)$ obtained by dividing $c/(n_G \cdot \Delta f)$ by an integer, where c represents a velocity of light, $n_G$ represents a group refractive index, and $\Delta f$ represents a frequency spacing among the plurality of types of wavelengths.

5. The optical transmission apparatus as claimed in claim 1, wherein at a preceding stage of one of the plurality of optical couplers at a first stage, the first optical waveguide and the second optical waveguide are connected to two outputs from a two-dimensional grating coupler.

6. The optical transmission apparatus as claimed in claim 1, further comprising:
a wavelength demultiplexing element connected to the first optical waveguide via one of the plurality of optical couplers at a last stage, and configured to demultiplex the plurality of types of wavelengths.

7. The optical transmission apparatus as claimed in claim 6, wherein the wavelength demultiplexing element is a demultiplexer.

8. The optical transmission apparatus as claimed in claim 6, further comprising:
a same number of light-receiving elements as the number of the plurality of types of wavelengths, configured to receive output of the wavelength demultiplexing element.

9. The optical transmission apparatus as claimed in claim 8, further comprising:
an electrical receiver circuit configured to apply signal processing to an electrical signal output from the light-receiving element.

10. An optical element, comprising:
a first optical waveguide and a second optical waveguide configured to transmit light having a plurality of types of wavelengths;
a plurality of optical couplers provided on the first optical waveguide and the second optical waveguide, and configured to couple the light transmitted through the first optical waveguide with the light transmitted through the second optical waveguide, so as to output the coupled light to the first optical waveguide and the second optical waveguide;
a plurality of phase shifters provided at preceding stages of part of the plurality of optical couplers, and configured to change a phase shift amount of the light transmitted through the first optical waveguide, transmitted through the second optical waveguide, or transmitted through both the first optical waveguide and the second optical waveguide, wherein a number of optical couplers in the part is greater than or equal to a number of the plurality of types of wavelengths;
a monitor configured to monitor an intensity of the light output to the second optical waveguide via one of the plurality of optical couplers at a last stage; and
a controller configured to control the plurality of phase shifters,
wherein the controller increases or decreases the phase shift amount for said each of the plurality of phase shifters to determine a direction of change to decrease an output of the monitor for said each of the plurality of phase shifters, and changes the phase shift amount in the direction in said each of the plurality of phase shifters.

* * * * *